US012619624B2

(12) United States Patent
Ma et al.

(10) Patent No.: US 12,619,624 B2
(45) Date of Patent: May 5, 2026

(54) SYSTEMS AND METHODS FOR AI-BASED SEARCHING

(71) Applicant: YAHOO ASSETS LLC, New York, NY (US)

(72) Inventors: Yufeng Ma, Santa Clara, CA (US); Yunzhong Liu, San Leandro, CA (US); Rao Shen, Sunnyvale, CA (US)

(73) Assignee: YAHOO ASSETS LLC, New York, NY (US)

( * ) Notice: Subject to any disclaimer, the term of this patent is extended or adjusted under 35 U.S.C. 154(b) by 84 days.

(21) Appl. No.: 18/585,765

(22) Filed: Feb. 23, 2024

(65) Prior Publication Data

US 2025/0272304 A1    Aug. 28, 2025

(51) Int. Cl.
*G06F 16/248* (2019.01)

(52) U.S. Cl.
CPC ................................. *G06F 16/248* (2019.01)

(58) Field of Classification Search
CPC .................................................... G06F 16/248
USPC ......................................................... 707/722
See application file for complete search history.

(56) References Cited

U.S. PATENT DOCUMENTS

| | | | | |
|---|---|---|---|---|
| 12,038,918 | B1 * | 7/2024 | Zhang | G06F 16/3329 |
| 2011/0072023 | A1 * | 3/2011 | Lu | G06F 16/353 |
| | | | | 707/741 |
| 2016/0180247 | A1 * | 6/2016 | Li | G06N 20/00 |
| | | | | 706/12 |
| 2023/0409996 | A1 * | 12/2023 | Choi | G06F 16/24578 |
| 2024/0282296 | A1 * | 8/2024 | Bhathena | G10L 15/1815 |

* cited by examiner

*Primary Examiner* — Kimberly L Wilson

(74) *Attorney, Agent, or Firm* — James J. DeCarlo; Greenberg Traurig, LLP

(57) ABSTRACT

Disclosed are systems and methods that provide a decision-intelligence (DI)-based, computerized framework for compiling and leveraging reliable sequence taggings for input queries related to executed searches. The disclosed framework can compile a trained computer model to fulfill partially labeled queries tagged by AI models as fully labeled queries. The disclosed framework can further leverage other AI models (e.g., deep neural networks, knowledge graphs, and the like), so that cross-checks can be performed between different models to guarantee high quality of labeled tokens. Thus, the framework can automatically generate and implement reliable training data to train a sequence tagging model for search query understanding. Thus, the search engine operating on such tagging model can provide improved results.

17 Claims, 8 Drawing Sheets dell 27 inch monitor

Brand　　　　　　　　　　Product dell 27 inch monitor

Brand　　　　Size　　　　Product

SYSTEMS AND METHODS FOR AI-BASED SEARCHING

FIELD OF THE DISCLOSURE

The present disclosure is generally related to artificial intelligence (AI)-based searching over a network, and more particularly, to a decision intelligence (DI)-based computerized framework for compiling and leveraging reliable sequence tagging for input queries related to executed searches.

SUMMARY OF THE DISCLOSURE

In order to train or improve a query tagging model, a challenging task is to gather large amounts of high-quality labeled data. Conventionally, this would require domain experts to manually tag thousands or millions of examples, which is not only labor intensive and time consuming, but also of questionable quality since manual judgment can be extremely subjective between different people. Recently, with the development of Large Language Models (LLMs), more and more people are leveraging AI models to generate labeled data. However, questions still remain as to whether such data can be properly utilized and trusted for training a query tagging model.

For example, there are two challenges with such an approach. First, with a dedicatedly designed prompt, LLMs are only able to finish well with a specific task, such as labeling the tokens that belong to some domains. For example, for a search query "dell 27 inch monitor", an LLM can be asked to tag the product ("monitor") or manufacture ("dell") within the query, and leave the remaining tokens untouched. Similarly, there are other existing AI models that can only detect part of a sequence. However, for query tagging, the whole sequence needs to be completely labeled in order to train a query tagging model. Thus, current implementation of LLMs and AI models fall short.

Secondly, the quality of such labeled tokens can be considered questionable, at best, since AI models are still far from completely reliable in their outputs. For example, LLMs have been known to perform hallucination behavior as they can generate non-factual information. This would make the generated data's quality suboptimal for model training.

To that end, the disclosed systems and methods provide a novel, computerized search query tagging framework that addresses the above shortcomings, among other technical benefits, as discussed herein. According to some embodiments, as discussed in more detail below, a Conditional Random Field (CRF) model, referred to as "Partial2full" (or "Partial2full CRF," or "Partial2full tagging model," used interchangeably), can be generated (or designed) and trained to fulfill partially labeled queries tagged by AI models as fully labeled queries. Moreover, in some embodiments, besides LLMs' partial tagging of specific domains for an input query, the disclosed framework can leverage other AI models (e.g., deep neural networks, knowledge graphs, and the like, as discussed below), so that cross-checks can be performed between different models to guarantee high quality of labeled tokens.

Accordingly, the disclosed framework can operate as a computational pipeline of steps (or phases) that can include, but are not limited to, generating partially labeled data on specific domains from different knowledge resources (e.g., including, for example, a LLM, deep learning model, and knowledge graph, and the like), developing/generating a Partial2full model which tags other untagged domains so that huge amounts of training data with complete tagging are generated, and then automatically generating and implementing reliable training data to train a sequence tagging model for search query understanding.

Accordingly, as discussed herein, implementation of an LLM (and/or any other form of AI/machine learning (ML) model) can generate extraction requests that can be dynamically executed and updated, which can enable the framework to focus on contextual and/or topical aspects of categories of data. This, as evidenced from the below discussion, can provide mechanisms for search engines to harness, for example. Thus, rather than leveraging generic tools and/or manual "tweaking" to obtain data about a topic or category (e.g., a taxonomy) and/or its performance, as with conventional systems, the disclosed systems and methods provide novel technicality that can optimize, in a dynamic manner, how queries are tagged and utilized for purposes of executing a search, thereby increasing a search's accuracy and efficiency in identifying the requested content.

Some LLMs have, among other features and capabilities, theory of mind, abilities to reason, abilities to make a list of tasks, abilities to plan and react to changes (via reviewing their own previous decisions), abilities to understand multiple data sources (and types of data—multimodal), abilities to have conversations with humans in natural language, abilities to adjust, abilities to interact with and/or control application program interfaces (APIs), abilities to remember information long term, abilities to use tools (e.g., read multiple schedules/calendars, command other systems, search for data, and the like), abilities to use other LLM and other types of AI/ML (e.g., neural networks to look for patterns, recognize humans, pets, and the like, for example), abilities to improve itself, abilities to correct mistakes and learn using reflection, and the like.

Thus, as provided herein, the disclosed integration of such LLM technology, as well as known or to be known AI/ML models, to execute the disclosed content discovery mechanisms discussed herein provides an improved system that can enable the creation of new ways of identifying, locating and providing digital content to users, inter alia.

According to some embodiments, a method is disclosed for a DI-based computerized framework for compiling and leveraging reliable sequence taggings for input queries related to executed searches. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for deterministically compiling and leveraging reliable sequence taggings for input queries related to executed searches.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

DETAILED DESCRIPTION

Figure 1:
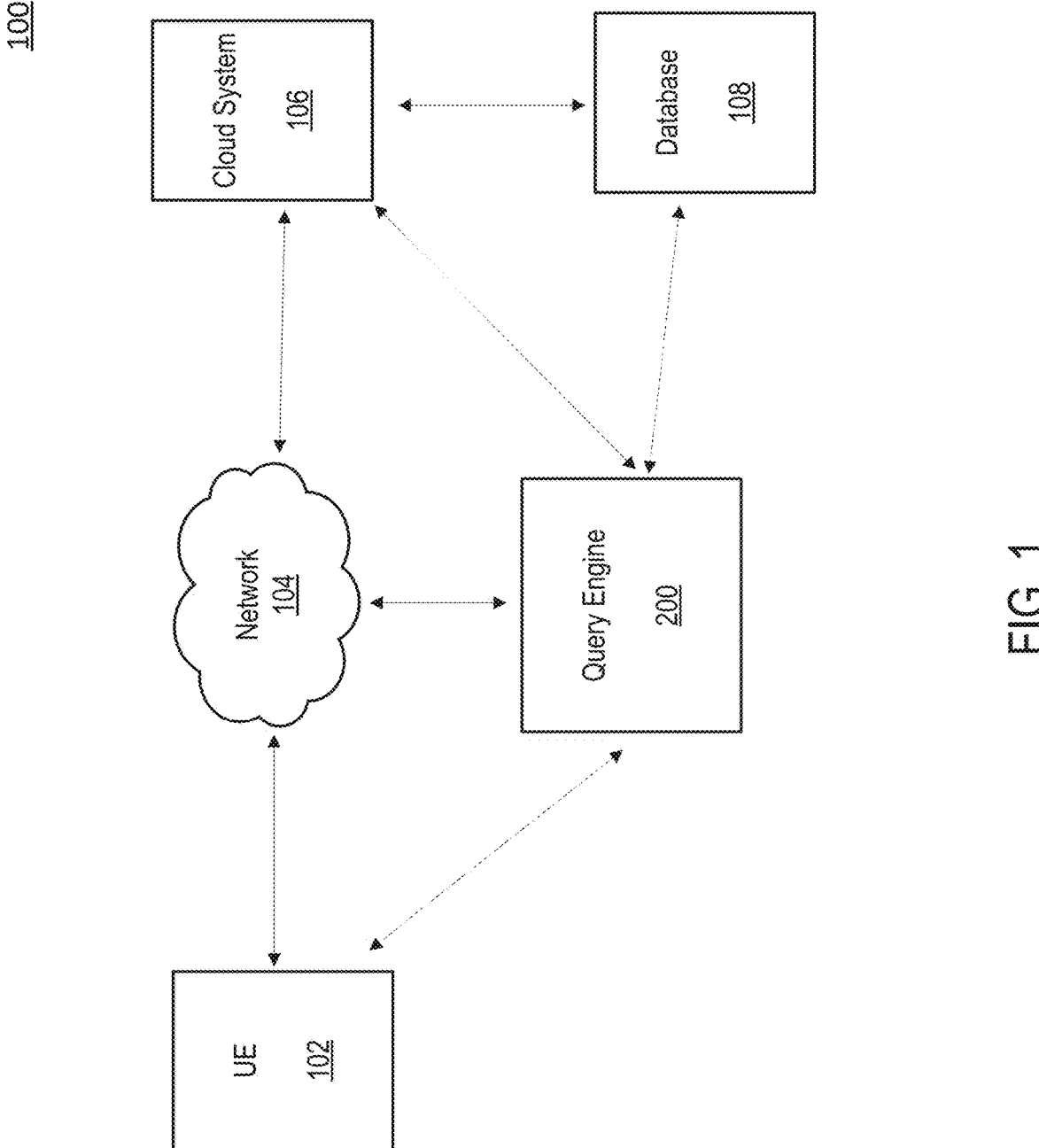
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ different architectures or may be compliant or compatible with different protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures. As discussed above, by way of background, there are currently mainly two problems when generating labeled query data via AI models, such as LLMs or deep neural networks. First, most of such AI models are domain specific, which means they could do well only within its own domain. However for query tagging, it would require a model that can tag every token which could belong to various domains. Second, although AI models can achieve acceptable prediction performance, they are still far from optimal (e.g., as to their accuracy), yet this is what a good training dataset needs.

Accordingly, faced with the above two technical shortcomings, among others, the disclosed systems and methods provide an improved framework that leverages additional and/or alternative AI models from certain domains to perform cross-checking operations in order to make sure the generated labels are of high quality (e.g., an accuracy meeting and/or surpassing a threshold). Further, the framework's operation involves the design and training of a Partial2full model that can fulfill partially labeled queries as fully labeled versions. Among other technical benefits, this can enable the generation of unlimited amounts of training data for query tagging, which thereby leads to an improved accurate and efficient tagging model. Thus, the search engine operating on such tagging model can provide improved results, thereby improving a user's experience, among other benefits, as evident from the disclosure herein.

With reference to FIG. 1, system 100 is depicted which includes user equipment (UE) 102 (e.g., a client device, as mentioned above and discussed below in relation to FIG. 7), network 104, cloud system 106, database 108, and query engine 200. It should be understood that while system 100 is depicted as including such components, it should not be construed as limiting, as one of ordinary skill in the art would readily understand that varying numbers of UEs, peripheral devices, cloud systems, databases, network resources, engines and networks can be utilized; however, for purposes of explanation, system 100 is discussed in relation to the example depiction in FIG. 1.

According to some embodiments, UE 102 can be any type of device, such as, but not limited to, a mobile phone, tablet, laptop, Internet of Things (IoT) device, autonomous machine, and any other device equipped with a cellular or wireless or wired transceiver.

In some embodiments, a peripheral device (not shown) can be connected to UE 102, and can be any type of peripheral device, such as, but not limited to, a wearable device (e.g., smart watch), printer, speaker, and the like. In some embodiments, a peripheral device can be any type of device that is connectable to UE 102 via any type of known or to be known pairing mechanism, including, but not limited to, WiFi, Bluetooth™, Bluetooth Low Energy (BLE), NFC, and the like.

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a network platform (e.g., Yahoo!®), which has associated network resources hosted on the internet or private network (e.g., network 104), which enables (via engine 200) the tagging and search functionality and capabilities discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE, and the services and applications provided by cloud system 106 and/or query engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 5:
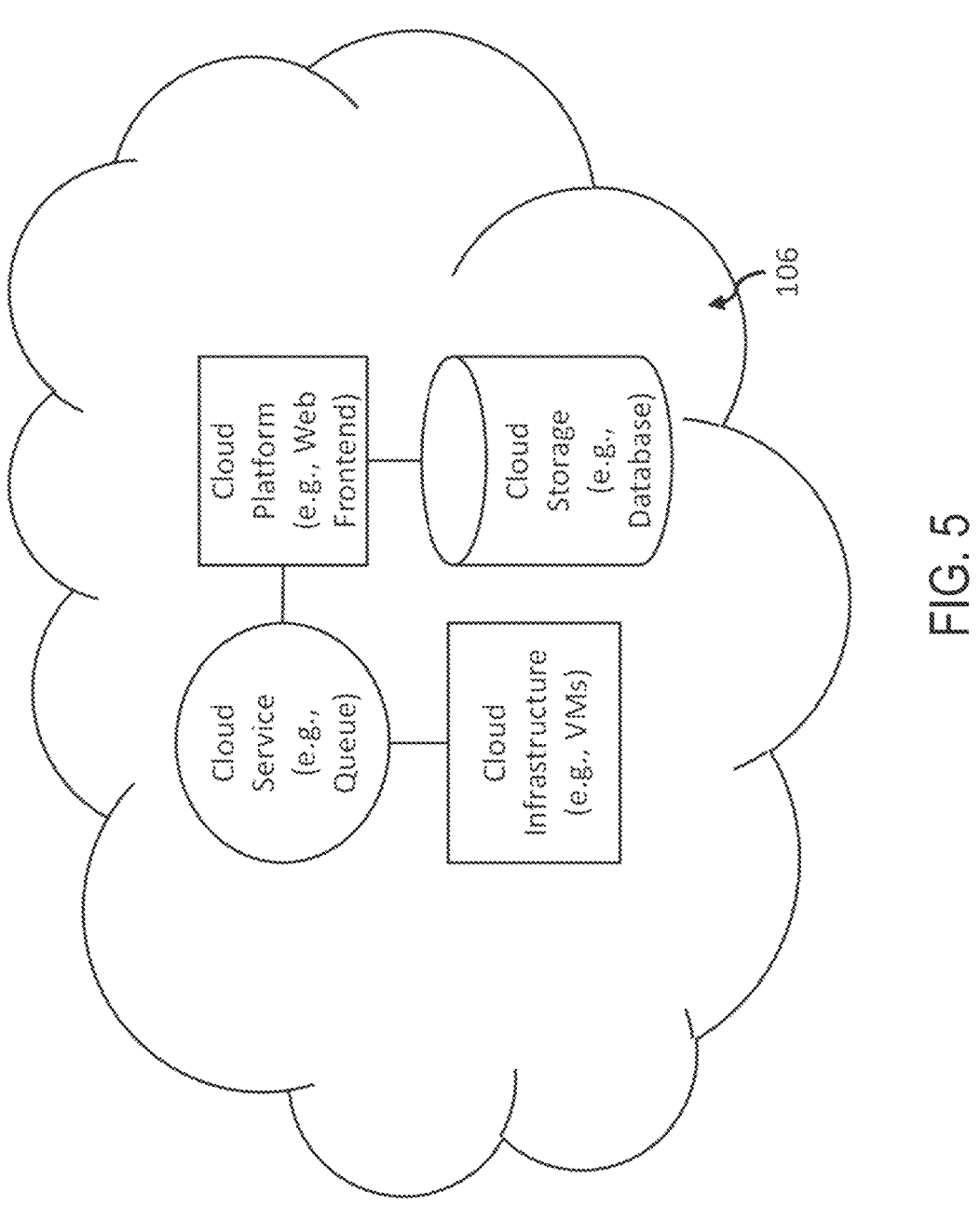
FIG. 5 depicts an exemplary implementation of an architecture according to some embodiments of the present disclosure.
Figure 6:
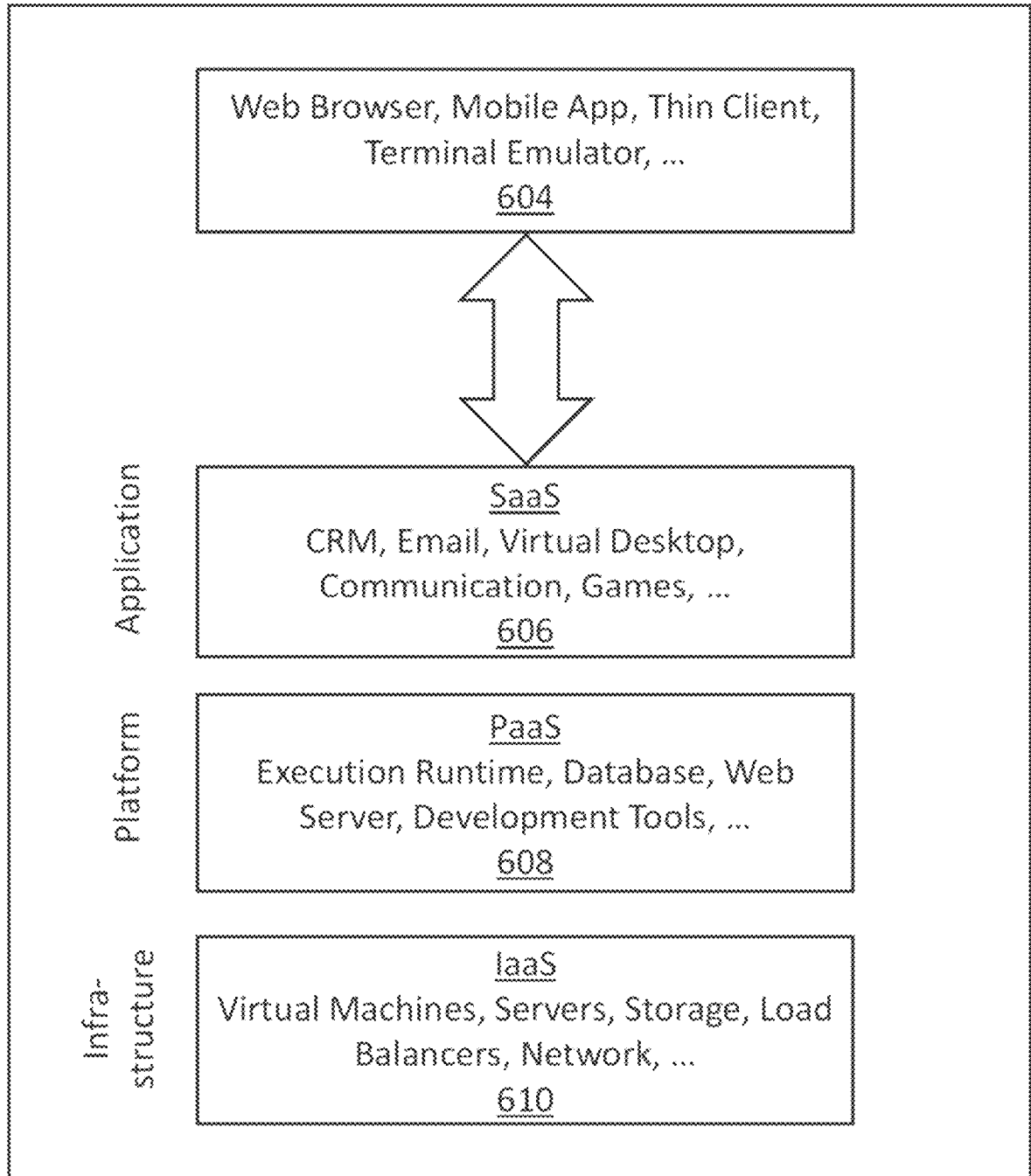
FIG. 6 depicts an exemplary implementation of an architecture according to some embodiments of the present disclosure.

Turning to FIG. 5 and FIG. 6, in some embodiments, the exemplary computer-based systems/platforms, the exemplary computer-based devices, and/or the exemplary computer-based components of the present disclosure may be specifically configured to operate in a cloud computing/architecture 106 such as, but not limiting to: infrastructure as a service (IaaS) 610, platform as a service (PaaS) 608, and/or software as a service (SaaS) 606 using a web browser, mobile app, thin client, terminal emulator or other endpoint 604. FIG. 5 and FIG. 6 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

Query engine 200, as discussed above and further below in more detail, can include components for the disclosed functionality. According to some embodiments, query engine 200 may be a special purpose machine or processor, and can be hosted by a device on network 104, within cloud system 106, and/or on UE 102. In some embodiments, engine 200 may be hosted by a server and/or set of servers associated with cloud system 106.

According to some embodiments, as discussed in more detail below, query engine 200 may be configured to implement and/or control a plurality of services and/or microservices, where each of the plurality of services/microservices are configured to execute a plurality of workflows associated with performing the disclosed search functionality. Non-limiting embodiments of such workflows are provided below in relation to at least FIG. 3.

According to some embodiments, as discussed above, query engine 200 may function as an application provided by cloud system 106. In some embodiments, engine 200 may function as an application installed on a server(s), network location and/or other type of network resource associated with system 106. In some embodiments, engine 200 may function as an application installed and/or executing on UE 102. In some embodiments, such application may be a web-based application accessed by UE 102 over network 104 from cloud system 106. In some embodiments, engine 200 may be configured and/or installed as an augmenting script, program or application (e.g., a plug-in or extension) to another application or program provided by cloud system 106 and/or executing on UE 102.

Figure 2:
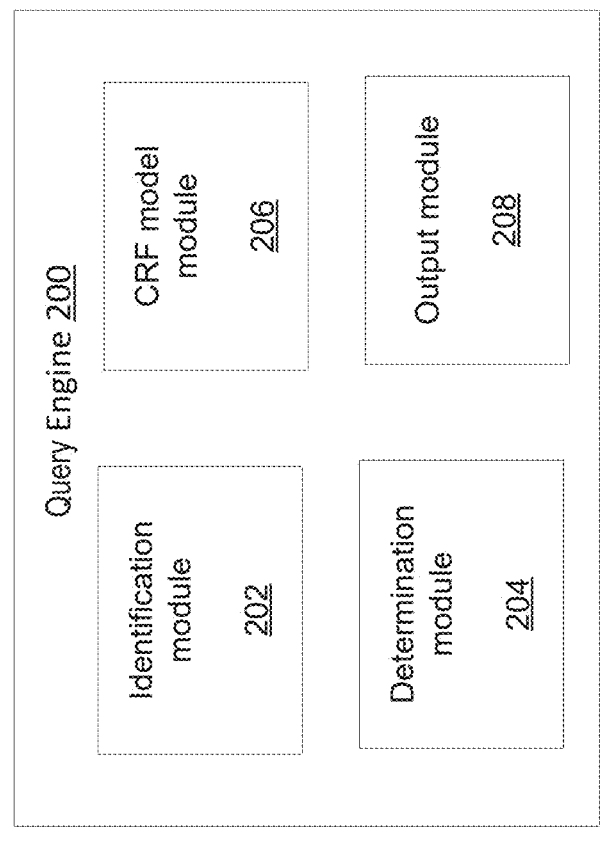
FIG. 2 is a block diagram illustrating components of an exemplary system according to some embodiments of the present disclosure.

As illustrated in FIG. 2, according to some embodiments, query engine 200 includes identification module 202, determination module 204, CRF model module 206 and output module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Figure 3:
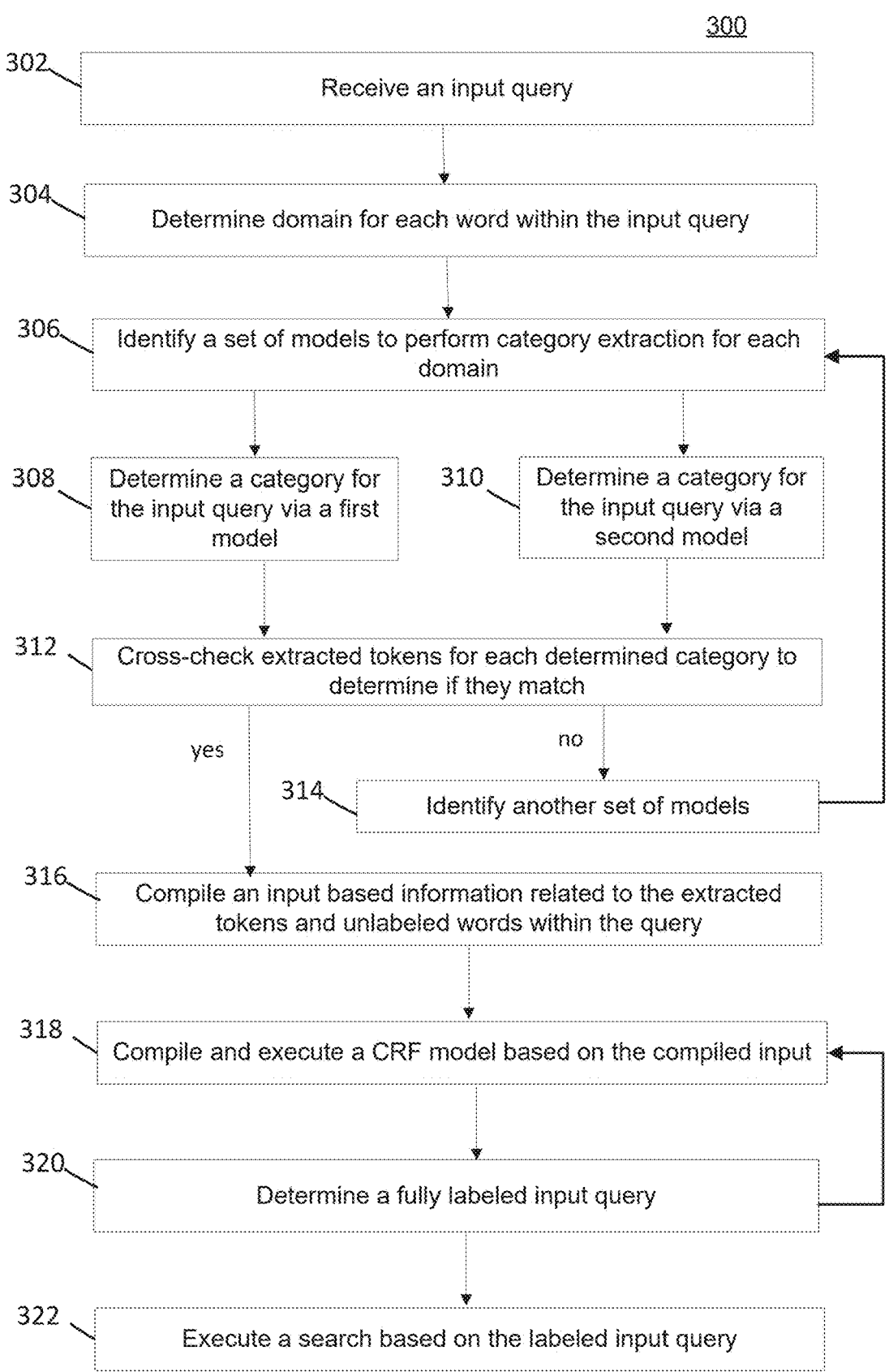
FIG. 3 illustrates an exemplary workflow according to some embodiments of the present disclosure.

Turning to FIG. 3, Process 300 provides non-limiting example embodiments for the disclosed search framework. As provided below, the disclosed framework's configuration and implementation can provide a computerized suite of search tools for identifying and retrieving content from received queries over a computer network.

According to some embodiments, Steps 302, 306 and 314 of Process 300 can be performed by identification module 202 of query engine 200; Steps 304, 308-312 and 316 can be performed by determination module 204; Steps 318 and 320 can be performed by CRF model module 206; and Step 322 can be performed by output module 208.

Figure 4A:
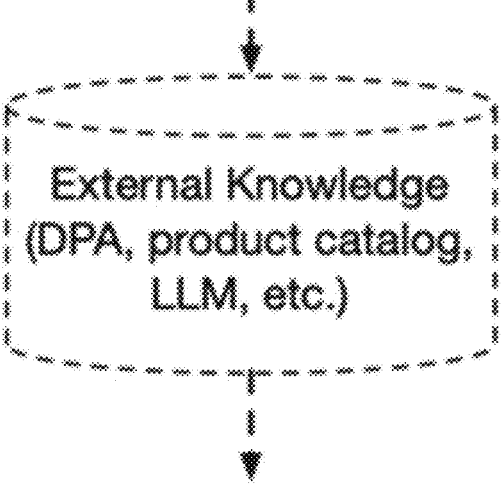
FIGS. 4A-4B depict non-limiting example embodiments according to some embodiments of the present disclosure.
Figure 4A:
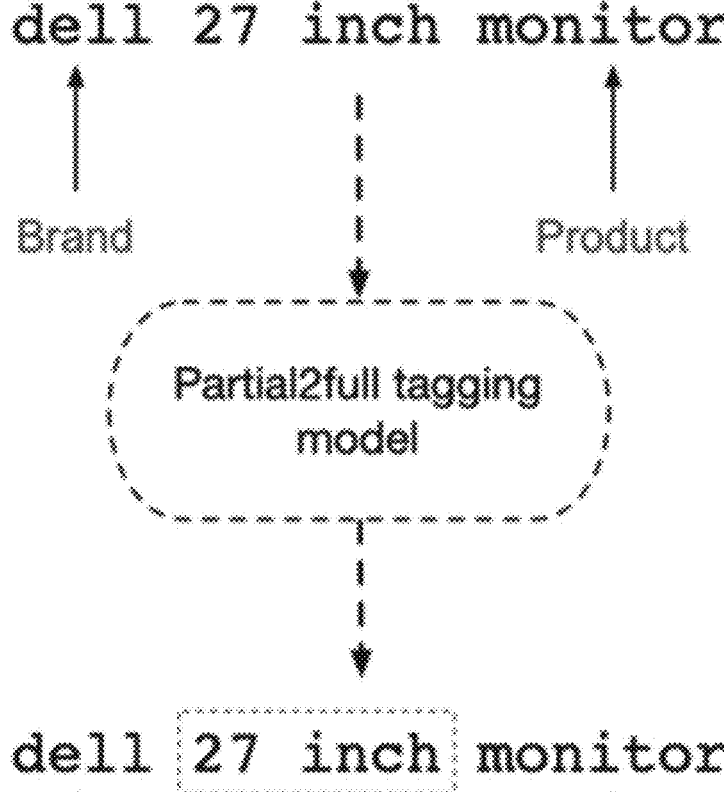
Figure 4A:

According to some embodiments, Process 300 begins with Step 302 where engine 200 can receive an input query. The input query can correspond to a type of content being searched for—for example, as depicted in FIG. 4A, the input can be "dell 27 inch monitor". In some embodiments, the input can comprise a character string, which can constitute a word, set of words and/or a phrase(s), and the like. In some embodiments, the input query can be provided via text input, voice input, drag/drop operations, feature extraction from an input image, and the like.

In Step 304, engine 200 can determine a domain for each word within the input query. That is, in some embodiments, engine 200 can analyze the input query, and determine which words within the query correspond to a known domain. The analysis can involve parsing the input string, extracting each word (and/or word combination), and comparing against a knowledge base via a natural language processing (NLP) algorithm (or other form of LLM). Such analysis and determination can be based on a set of information per domain, which can be derived from and/or provided from, but not limited to, via a database(s), catalog of information, LLM, BERT-based entity extraction model, and the like, or some combination thereof. Thus, the information can correspond to an existing domain knowledge base, from which known or understood types of categories of information can be used to categorize words within a query.

For example, as depicted in FIG. 4A, "dell" can correspond to a brand domain, and "monitor" can correspond to a product domain. The "27", "inch" and "27 inch" words can be determined to not correspond to a known domain; therefore, as discussed herein, they remain unlabeled at this juncture of Process 300, for which labeling is performed via the subsequent steps of the CRF model processing.

In Step 306, engine 200 can determine a set of AI models for which the words can be categorized and labeled. For example, an LLM trained for analyzing "product" domain words can be called and executed; and in another example, a neural network (e.g., BERT-based deep neural network) for analyzing "product" domain information can also be called and executed, as discussed below.

According to some embodiments, the AI models can be any type of known or to be known, specifically trained AI/ML model, particular machine learning model architecture, particular machine learning model type (e.g., convolutional neural network (CNN), recurrent neural network (RNN), autoencoder, support vector machine (SVM), and the like), or any other suitable definition of a AI/ML model or any suitable combination thereof.

In some embodiments, an LLM can be leveraged, as discussed herein, whether known or to be known. As discussed above, an LLM is a type of AI system designed to understand and generate human-like text based on the input it receives. The LLM can implement technology that involves deep learning, training data and natural language processing (NLP). Large language models are built using deep learning techniques, specifically using a type of neural network called a transformer. These networks have many layers and millions or even billions of parameters. LLMs can be trained on vast amounts of text data from the internet, books, articles, and other sources to learn grammar, facts, and reasoning abilities. The training data helps them understand context and language patterns. LLMs can use NLP techniques to process and understand text. This includes tasks like tokenization, part-of-speech tagging, and named entity recognition.

LLMs can include functionality related to, but not limited to, text generation, language translation, text summarization, question answering, conversational AI, text classification, language understanding, content generation, and the like. Accordingly, LLMs can generate, comprehend, analyze and output human-like outputs (e.g., text, speech, audio, video, and the like) based on a given input, prompt or context. Accordingly, LLMs, which can be characterized as transformer-based LLMs, involve deep learning architectures that utilizes self-attention mechanisms and massive-scale pre-training on input data to achieve NLP understanding and generation. Such current and to-be-developed models can aid AI systems in handling human language and human interactions therefrom.

In some embodiments, engine 200 may be configured to identify and utilize one or more AI/ML techniques selected from, but not limited to, computer vision, feature vector analysis, decision trees, boosting, support-vector machines, neural networks, nearest neighbor algorithms, Naive Bayes, bagging, random forests, logistic regression, and the like.

In some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:

a. define Neural Network architecture/model, b. transfer the input data to the neural network model, c. train the model incrementally, d. determine the accuracy for a specific number of timesteps, e. apply the trained model to process the newly received input data, f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

Accordingly, in Step 308, engine 200 can execute an identified AI model (e.g., a first model from the set of models in Step 306) for each word for which a domain has been identified. Step 310 operates similarly, but uses a second identified AI model. Thus, for the input query, a set of models can be identified, called and executed for each of the words "dell" and "monitor", as discussed above.

For example, as per the above example, for "dell", the word can be analyzed and labeled via the LLM model (e.g., Step 308); and can be analyzed and labeled via the neural network model (e.g., Step 310). It should be understood that while only two models are used for a word, it should not be construed as limiting, as any whole number greater than 1 can be used, for which their results can be compared, as discussed infra.

According to some embodiments, if/when the neural network is a BERT-based extraction model, a taxonomy can be determined (e.g., a Google Product Taxonomy (GPT) category), which can be utilized during the tagging of the word. In some embodiments, if/when a LLM is used, specifically designed prompts can be generated so that the outputs can be engineered. For example, a prompt can recite "Extract the specific product category (excluding the brand, material or product modifiers) from the query. The product category name should be in its raw form mentioned in the query."

Accordingly, the Steps 304-310 can be performed for each labelable word within the query (as determined via the processing in Step 304, discussed supra). An example of this is depicted in FIG. 4A, where "dell" is labeled as "brand"

and "monitor" is labeled as "product" as an output from the "External Knowledge" component of the disclosed pipeline.

In Step 312, engine 200 can perform a cross-check operation for each word (e.g., referred to as word input query—for example, "dell" and "monitor"). Thus, the tokens determined from Steps 308 and 310 for "dell" can be cross-checked, and the tokens determined from Steps 308 and 310 for "monitor" can be cross-checked.

According to some embodiments, the cross-checking operations can involve engine 200 executing any of the AI/ML and/or LLM analysis discussed above. Thus, engine 200 can perform a determination as to whether the tokens from each AI model (e.g., Steps 308 and 310) for each word match. For example, does the label determined for "dell" from Step 308 match the label determined from Step 310. In some embodiments, such match determination can be in accordance with a similarity threshold, whereby if the threshold is satisfied, then a match can be confirmed. Such similarity threshold can correspond to a "high quality" labeling.

In some embodiments, when a match is not determined, engine 200 can proceed from Step 312 to Step 314. In Step 314, engine 200 can identify another set of models, which can be an entirely different set of models, or a single different model, whereby processing recursively reverts back to Step 306 to perform the category extraction, as discussed above. Such processing can be performed until a match is identified via Step 312 and/or a predetermined number of iterations have been executed (no match within 3 attempts). Upon no match, the word would be considered "unlabeled" as and treated accordingly as per the below discussion.

In some embodiments, when a match is determined in Step 312, engine 200 can proceed to Step 316. Step 316 can be performed once determinations for each word within the input query has been performed (e.g., words are labeled and/or non-labeled). An example of this is provided in FIG. 4A, respective to the input to the Partial2full tagging model.

Accordingly, in Step 316, engine 200 can compile an input for the CRF model (e.g., Partial2full model). In some embodiments, the input includes information related to the input query, which can include the labeled words, discussed above, and the unlabeled words, also discussed above. For example, as depicted in FIG. 4A, the compiled input from Step 316 can include "dell", "27 inch", "monitor", and data indicating the labels for "dell" and "monitor".

In Step 318, engine 200 can execute the CRF model based on the compiled input from Step 316. Such execution leverages information from the input query and the determined labels (e.g., partial label) to generate a full labeling of the input query.

Figure 4B:
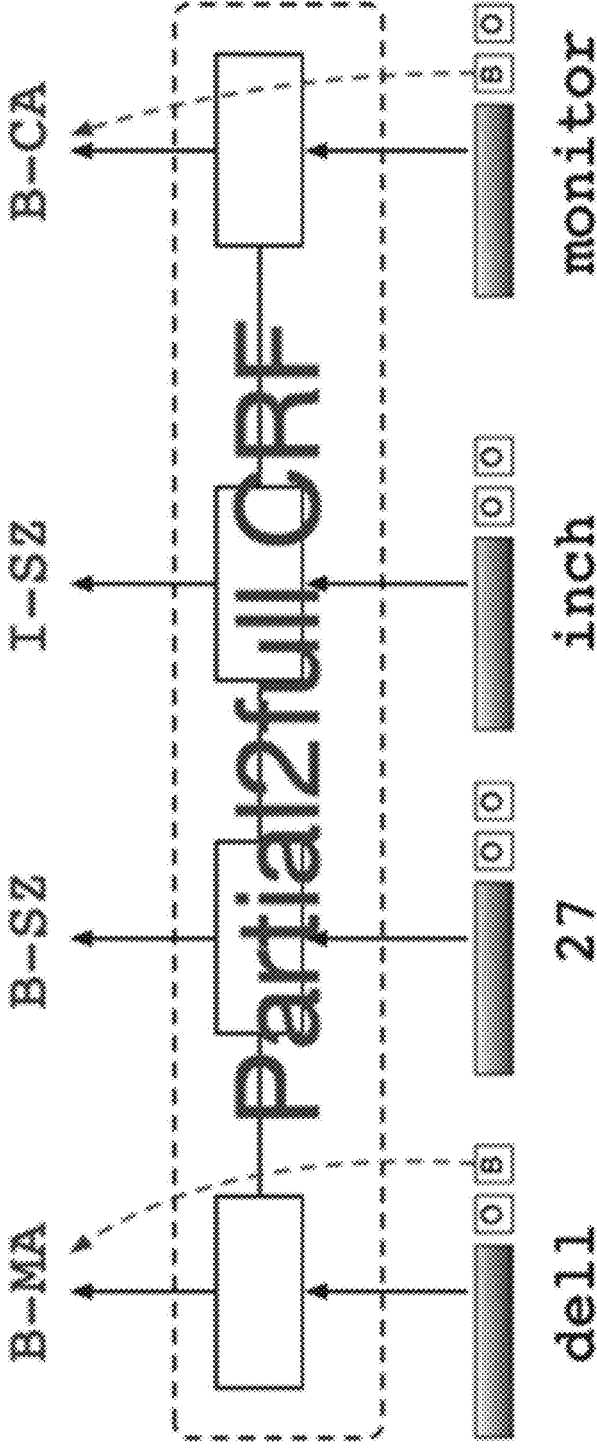

With reference to FIG. 4B, provided is a non-limiting example of the execution of the Partial2full CRF model. By way of a non-limiting example, the Partial2full model can ingest the compiled input (from Step 316), and if the tokens belong to "brand" or "product" domain, the model can set the feature value to "B" or "I" accordingly. For example, the first blank box after the shaded box (which corresponds to a feature set) represents whether the word is a product or not, while the second blank box denotes the brand category. In some embodiments, engine 200 can use we use BIO format for feature value representation, where "B" stands for the beginning of a label, "I" means intermediate of the label, and "O" represents that a word/character(s) is outside the label span/range. Thus, based on the existing labeled dataset (from the compiled input query), since engine 200 has determined tokens for a portion of the words in the input query, for a brand category (MA as shown in FIG. 4B) or product category (CA as shown FIG. 4B), engine 200 can correspondingly set the feature values. However, in some embodiments, when not capable of setting the values based on the particular category (e.g., brand, product, for example), the model can set the word as "O".

According to some embodiments, the CRF model can utilize a trained sequence labeling model to traverse the compiled input.

As such, as in Step 320, engine 200 can determine, via execution of the CRF model in Step 318, a fully labeled input query. An example of this is depicted in FIGS. 4A and 4B. As further depicted in FIG. 3, engine 200 can utilize the generated label of the input, along with the information derived, determined, generated or otherwise identified from the preceding steps of Process 300 to further train the CRF model (as per the line from Step 320 back to Step 318).

And, in Step 322, engine 200 can execute the query of a repository based on the labeled input query (from Step 320), whereby a set of results related to 27 inch monitors from Dell® can be provided within a user interface (UI).

Figure 7:
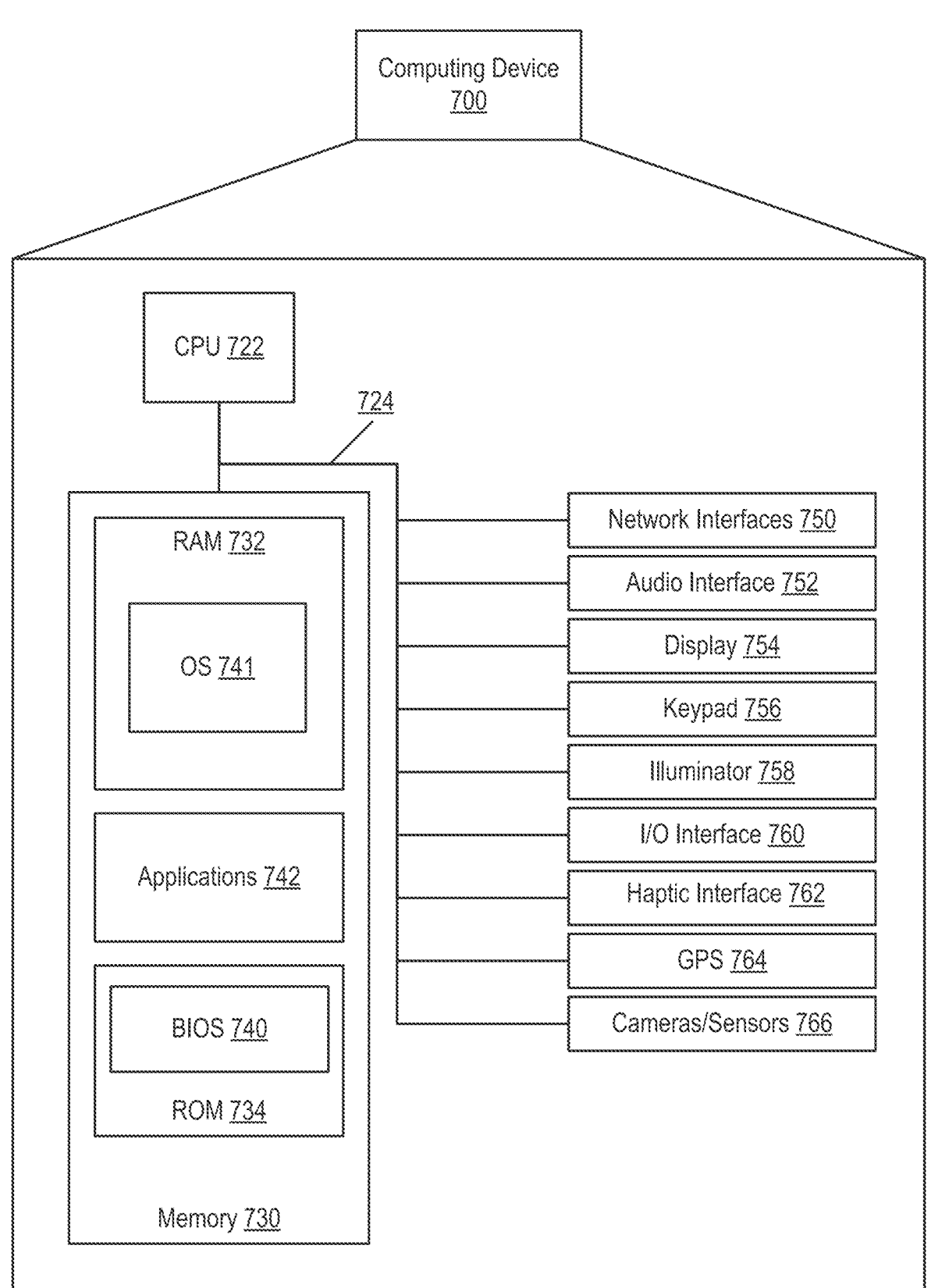
FIG. 7 is a block diagram illustrating a computing device showing an example of a client or server device used in various embodiments of the present disclosure.

FIG. 7 is a schematic diagram illustrating a client device showing an example embodiment of a client device that may be used within the present disclosure. Client device 700 may include many more or less components than those shown in FIG. 7. However, the components shown are sufficient to disclose an illustrative embodiment for implementing the present disclosure. Client device 700 may represent, for example, UE 102 discussed above at least in relation to FIG. 1.

As shown in the figure, in some embodiments, Client device 700 includes a processing unit (CPU) 722 in communication with a mass memory 730 via a bus 724. Client device 700 also includes a power supply 726, one or more network interfaces 750, an audio interface 752, a display 754, a keypad 756, an illuminator 758, an input/output interface 760, a haptic interface 762, an optional global positioning systems (GPS) receiver 764 and a camera(s) or other optical, thermal or electromagnetic sensors 766. Device 700 can include one camera/sensor 766, or a plurality of cameras/sensors 766, as understood by those of skill in the art. Power supply 726 provides power to Client device 700.

Client device 700 may optionally communicate with a base station (not shown), or directly with another computing device. In some embodiments, network interface 750 is sometimes known as a transceiver, transceiving device, or network interface card (NIC).

Audio interface 752 is arranged to produce and receive audio signals such as the sound of a human voice in some embodiments. Display 754 may be a liquid crystal display (LCD), gas plasma, light emitting diode (LED), or any other type of display used with a computing device. Display 754 may also include a touch sensitive screen arranged to receive input from an object such as a stylus or a digit from a human hand.

Keypad 756 may include any input device arranged to receive input from a user. Illuminator 758 may provide a status indication and/or provide light.

Client device 700 also includes input/output interface 760 for communicating with external. Input/output interface 760 can utilize one or more communication technologies, such as USB, infrared, Bluetooth™, or the like in some embodiments. Haptic interface 762 is arranged to provide tactile feedback to a user of the client device.

Optional GPS transceiver 764 can determine the physical coordinates of Client device 700 on the surface of the Earth, which typically outputs a location as latitude and longitude values. GPS transceiver 764 can also employ other geo-positioning mechanisms, including, but not limited to, tri-angulation, assisted GPS (AGPS), E-OTD, CI, SAI, ETA, BSS or the like, to further determine the physical location of client device 700 on the surface of the Earth. In one embodiment, however, Client device 700 may through other components, provide other information that may be employed to determine a physical location of the device, including for example, a MAC address, Internet Protocol (IP) address, or the like.

Mass memory 730 includes a RAM 732, a ROM 734, and other storage means. Mass memory 730 illustrates another example of computer storage media for storage of information such as computer readable instructions, data structures, program modules or other data. Mass memory 730 stores a basic input/output system ("BIOS") 740 for controlling low-level operation of Client device 700. The mass memory also stores an operating system 741 for controlling the operation of Client device 700.

Memory 730 further includes one or more data stores, which can be utilized by Client device 700 to store, among other things, applications 742 and/or other information or data. For example, data stores may be employed to store information that describes various capabilities of Client device 700. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 700.

Applications 742 may include computer executable instructions which, when executed by Client device 700, transmit, receive, and/or otherwise process audio, video, images, and enable telecommunication with a server and/or another user of another client device. Applications 742 may further include a client that is configured to send, to receive, and/or to otherwise process gaming, goods/services and/or other forms of data, messages and content hosted and provided by the platform associated with engine 200 and its affiliates.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, API, instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application.

For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising steps of:
receiving, by a device, an input query, the input query comprising two words;
determining, by the device, a domain for a first word;
determining, by the device, two artificial intelligence (AI) models, each model being a different type of model for analyzing information related to the determined domain;
executing, by the device, each AI model based on the input query, the execution of each AI model comprising generating a label for the first word;
performing, by the device, a cross-check determination on each label for the first word, the cross-check determination comprising determining that a match between the labels for the first word exists;
executing, by the device, a third model based on the labeled first word and a second word;
determining, by the device, based on the third model execution, a fully labeled input query, the fully labeled input query comprising the labeled first word and a labeled second word;
executing, by the device, a search of a repository based on the fully labeled input query; and
outputting, for display within a user interface (UI), a search result.

2. The method of claim 1, wherein at least one of the AI models is a large language model (LLM), wherein the execution of the LLM comprises providing at least one prompt related to information related to the first word.

3. The method of claim 1, wherein at least one of the AI models comprises functionality related to a neural network and taxonomy, wherein information related to the taxonomy is provided to the neural network to determine the generated label for the first word.

4. The method of claim 1, wherein a domain corresponds to a category of information.

5. The method of claim 1, wherein the third model is a Conditional Random Field (CRF) model, wherein the execution of the CRF model comprises determining a set of tokens related to portions of the second word, wherein each token of the set of tokens relates to a feature representation of the second word.

6. The method of claim 1, further comprising:
compiling an input based on the labeled first word and the second word, wherein the input is a basis for the execution of the third model.

7. The method of claim 1, further comprising:
determining a match between the labels for the first word does not exist based on a similarity between the generated labels being below a similarity threshold; and
determining another set of AI models, the other set of AI models comprising at least one different AI model from the two AI models, wherein the generation of the AI labels is performed again based on the other set of AI models.

8. The method of claim 1, wherein a known domain does not exist for the second word.

9. The method of claim 1, wherein the input query comprises a plurality of words, wherein the steps are performed for each of the plurality of the words.

10. The method of claim 1, wherein the domain determination comprises identifying a plurality of AI models, wherein the plurality of AI models are utilized as a basis for the cross-check determination.

11. A device comprising:
a processor configured to:
receive an input query, the input query comprising two words;
determine a domain for a first word;
determine two artificial intelligence (AI) models, each model being a different type of model for analyzing information related to the determined domain;
execute each AI model based on the input query, the execution of each AI model comprising generating a label for the first word;
perform a cross-check determination on each label for the first word, the cross-check determination comprising determining that a match between the labels for the first word exists;
execute a third model based on the labeled first word and a second word;
determine, based on the third model execution, a fully labeled input query, the fully labeled input query comprising the labeled first word and a labeled second word;
execute a search of a repository based on the fully labeled input query; and
output, for display within a user interface (UI), a search result.

12. The device of claim 11, wherein at least one of the AI models is a large language model (LLM), wherein the execution of the LLM comprises providing at least one prompt related to information related to the first word.

13. The device of claim 11, wherein at least one of the AI models comprises functionality related to a neural network and taxonomy, wherein information related to the taxonomy is provided to the neural network to determine the generated label for the first word.

14. The device of claim 11, wherein the third model is a Conditional Random Field (CRF) model, wherein the execution of the CRF model comprises determining a set of tokens related to portions of the second word, wherein each token of the set of tokens relates to a feature representation of the second word.

15. The device of claim 11, wherein the processor is further configured to:

compile an input based on the labeled first word and the second word, wherein the input is a basis for the execution of the third model.

16. The device of claim 11, wherein the processor is further configured to:

determine a match between the labels for the first word does not exist based on a similarity between the generated labels being below a similarity threshold; and determine another set of AI models, the other set of AI models comprising at least one different AI model from the two AI models, wherein the generation of the AI labels is performed again based on the other set of AI models.

17. A non-transitory computer-readable storage medium tangibly encoded with computer-executable instructions that when executed by a device, perform a method comprising:

receiving, by the device, an input query, the input query comprising two words;

determining, by the device, a domain for a first word;

determining, by the device, two artificial intelligence (AI) models, each model being a different type of model for analyzing information related to the determined domain;

executing, by the device, each AI model based on the input query, the execution of each AI model comprising generating a label for the first word;

performing, by the device, a cross-check determination on each label for the first word, the cross-check determination comprising determining that a match between the labels for the first word exists;

executing, by the device, a third model based on the labeled first word and a second word;

determining, by the device, based on the third model execution, a fully labeled input query, the fully labeled input query comprising the labeled first word and a labeled second word;

executing, by the device, a search of a repository based on the fully labeled input query; and outputting, for display within a user interface (UI), a search result.

\* \* \* \* \*